US009797657B2

(12) United States Patent
Hammon et al.

(10) Patent No.: US 9,797,657 B2
(45) Date of Patent: Oct. 24, 2017

(54) HEAT EXCHANGER, REACTOR ARRANGEMENT COMPRISING THIS HEAT EXCHANGER AND METHOD FOR CONTROLLING THE TEMPERATURE OF A REACTOR

(71) Applicant: BASF SE, Ludwigshafen (DE)

(72) Inventors: Ulrich Hammon, Mannheim (DE); Thomas Walter, Hassloch (DE); Armin Schraut, Bensheim (DE)

(73) Assignee: BASF SE, Ludwigshafen (DE)

( * ) Notice: Subject to any disclaimer, the term of this patent is extended or adjusted under 35 U.S.C. 154(b) by 228 days.

(21) Appl. No.: 14/661,408

(22) Filed: Mar. 18, 2015

(65) Prior Publication Data
US 2015/0267967 A1 Sep. 24, 2015

Related U.S. Application Data

(60) Provisional application No. 61/954,669, filed on Mar. 18, 2014.

(30) Foreign Application Priority Data

Mar. 18, 2014 (DE) .................. 10 2014 103 691

(51) Int. Cl.
| | |
|---|---|
| *F28D 7/16* | (2006.01) |
| *B01J 8/06* | (2006.01) |
| *F28F 27/00* | (2006.01) |
| *F28D 21/00* | (2006.01) |

(52) U.S. Cl.
CPC .............. *F28D 7/16* (2013.01); *B01J 8/067* (2013.01); *F28F 27/00* (2013.01);
(Continued)

(58) Field of Classification Search
CPC B01J 8/067; B01J 8/0285; B01J 2208/00221; B01J 2208/00256;
(Continued)

(56) References Cited

U.S. PATENT DOCUMENTS

| | | | |
|---|---|---|---|
| 3,850,232 | A | 11/1974 | Wanka et al. |
| 7,442,835 | B2 | 10/2008 | Keggenhoff et al. |

(Continued)

FOREIGN PATENT DOCUMENTS

| | | |
|---|---|---|
| DE | 898 917 C | 12/1953 |
| DE | 10 57 623 B | 5/1959 |
| DE | 2 207 166 A1 | 9/1973 |
| DE | 10 2004 041777 A1 | 3/2006 |
| DE | 10-2006 034 811 A1 | 1/2008 |
| EP | 1 080 781 A1 | 3/2001 |
| EP | 1 882 518 A2 | 1/2008 |
| GB | 2 126 116 A | 3/1984 |
| WO | 2010/034292 A2 | 4/2010 |

OTHER PUBLICATIONS

U.S. Appl. No. 14/737,025, filed Jun. 11, 2015, Hammon, et al.
International Preliminary Report on Patentability issued Sep. 20, 2016 in corr. International Patent Application No. PCT/EP2015/054962, filed Mar. 10, 2015 (w/ English translation).
International Search Report mailed Jan. 22, 2016 in corr. International Patent Application No. PCT/EP2015/054962, filed Mar. 10, 2015 (w/ English translation of ISR Categories).

*Primary Examiner* — Lessanework Seifu
(74) *Attorney, Agent, or Firm* — Oblon, McClelland, Maier & Neustadt, L.L.P.

(57) ABSTRACT

A heat exchanger (1) contains: a bundle of at least two heat exchanger tubes (3), a heat exchanger housing (5) surrounding the bundle of heat exchanger tubes (3), wherein a liquid heat-transfer medium (7) is passed around the bundle of heat exchanger tubes (3) in the heat exchanger housing (5), a heat exchanger cap (9) sealing the top of the heat exchanger housing (5), a heat exchanger bottom (11) sealing the bottom of the heat exchanger housing (5), a feed point (13) for the heat-transfer medium (7), an outlet (15) for the heat-transfer medium (7), an emergency relief port (17) disposed in proximity to the heat exchanger cap (9). The heat exchanger (1) contains a safety device (19) disposed in proximity to the heat exchanger bottom (11).

16 Claims, 2 Drawing Sheets

Figure 1:
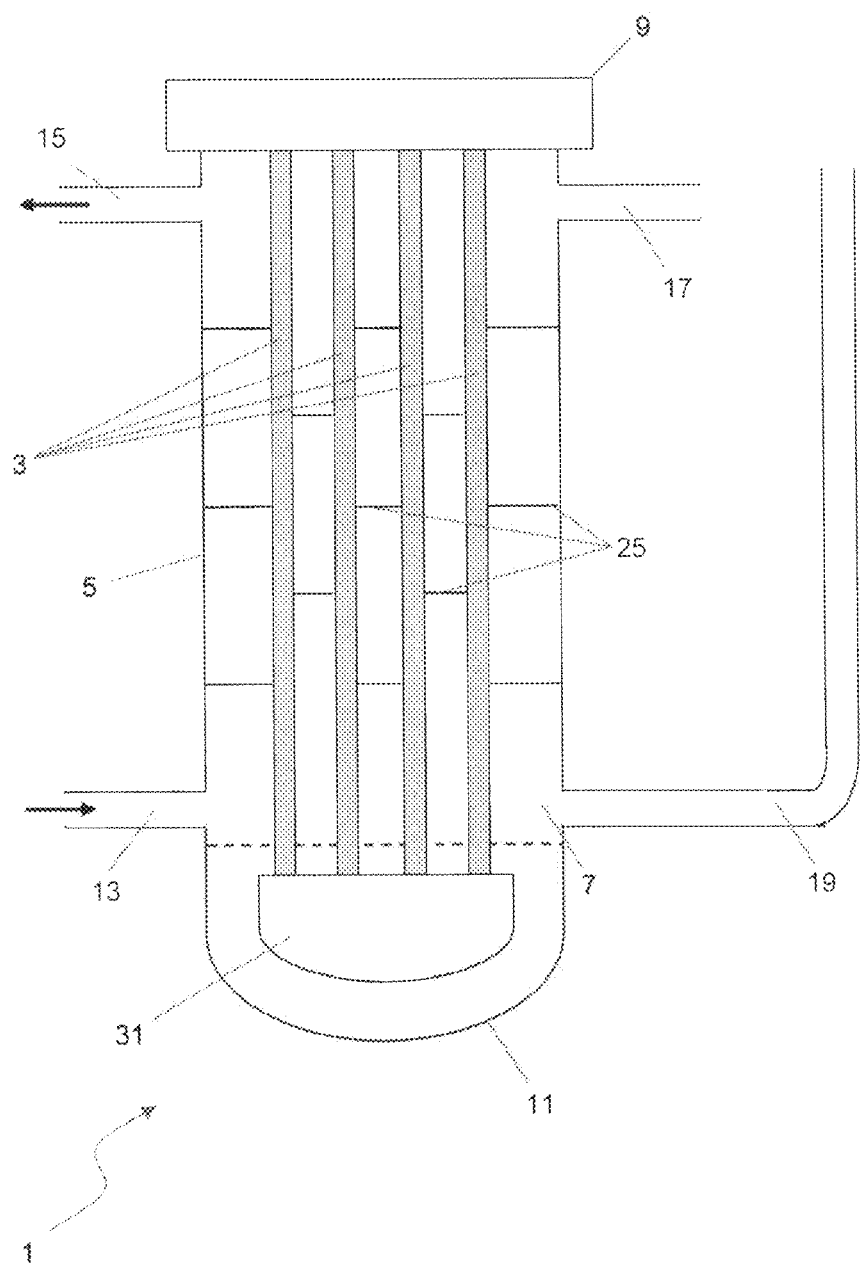

(52) U.S. Cl.
CPC ............ *B01J 2208/00221* (2013.01); *B01J 2208/00256* (2013.01); *F28D 2021/0022* (2013.01); *F28D 2021/0064* (2013.01); *F28F 2265/12* (2013.01)

(58) Field of Classification Search
CPC ........ B01J 2208/0053; B01J 2208/0007; B01J 2208/065; B01J 19/0013; B01J 19/2425; B01J 2219/00103; B01J 2219/00094; F28F 2265/12; F28F 27/00; F28F 27/02; F28D 7/16; F28D 7/163
See application file for complete search history.

(56) References Cited

U.S. PATENT DOCUMENTS

| 7,988,927 B2 | 8/2011 | Lehr et al. |
| 2008/0023175 A1 | 1/2008 | Lehr et al. |

HEAT EXCHANGER, REACTOR ARRANGEMENT COMPRISING THIS HEAT EXCHANGER AND METHOD FOR CONTROLLING THE TEMPERATURE OF A REACTOR

DESCRIPTION

This patent application claims the benefit of pending U.S. provisional patent application Ser. No. 61/954,669 and DE patent application Ser. No. DE 102014103691.3, both filed on Mar. 18, 2014, incorporated in their entirety herein by reference.

The present invention relates to a heat exchanger, to a reactor arrangement comprising a reactor and this heat exchanger and to a method for controlling the temperature of a reactor.

Heat exchangers for reactors and similar devices are known in principle from the prior art. Thus, DE 22 07 166 A1 describes a cooling assembly for reaction apparatuses comprising a recirculating heat-transfer medium, wherein a circulation pump and a cooler are disposed outside a reaction vessel for said heat-transfer medium. Therein, the circulation pump and the cooler are accommodated in two housings arranged side by side. Furthermore, an expansion vessel for the heat-transfer medium is disposed above and in communication with the pump housing and a vapor separator for the coolant is disposed directly above the cooler housing and in communication with the cooler tubes. A bursting disc may be disposed in the lid of the expansion vessel.

In connection with a method for varying the temperature of a shell-and-tube reactor, DE 10 2006 034 811 A1 describes a salt bath cooler with no specific restrictions on its cooling medium. The cooler has an equalization vessel with a fill-level gauge disposed therein. On reaching a predetermined fill level, excess heat-transfer medium flows away via an overflow and/or an emergency relief port. In addition to being used on excessive expansion of the heat-transfer medium, the emergency relief port also operates in the event of rupture of an evaporative cooler tube for example.

When operating a heat exchanger of the type in question as a cooler, the moment of leakage is critical. The cooler tubes contain water/water vapor at a pressure of 50 bar or more. Rupture of one of these cooler tubes, then, causes the water to be forced into the heat-transfer medium at this pressure. Since the liquid heat-transfer medium is circulated at a temperature of about 280° C. for example, the water vaporizes immediately and a spontaneous buildup of high pressure therefore occurs.

As described above, the prior art consequently includes precautionary measures in order to release pressure from the heat exchanger, i.e., cooler, in the event of overpressure. However, these devices have not fully proven themselves in practice. Heat exchangers of the type in question, in particular salt bath coolers, can measure between 4 m and 8 m in height. The rather unlikely cases of a cooler tube rupturing described in the prior art occur time and again in practice despite of the greatest care being taken and good plant maintenance. In this connection, it has been observed that such tube ruptures occur mainly in the lower region of the cooler tubes, i.e., only a small distance from the cooler tube plate.

When the cooling medium used is water, which is vaporized by the heat-transfer medium, it is generally present in liquid form up to a certain height in the lower region of the cooler tubes. In practice, tube ruptures are observed time and again in this specific region and these are attributable, inter alia, to incorrect operation of the coolers. Another reason for the tube ruptures may be inadequate feed water quality leading to unaccounted-for stresses and/or corrosion. When a tube rupture occurs, then, the steam needs to pass through the column of heat-transfer medium above it or displace the heat-transfer medium in order to release the built-up pressure via the emergency relief port known from the prior art or via the bursting disk. Such passing through or displacement is possible only with great difficulty, in particular with the conventionally used heat-transfer media of relatively high density, for example with salt baths having a density of 2.

As a result, the cooler jacket is exposed to a pressure for which it is not normally designed. Heat exchangers of the type in question, i.e., in particular coolers comprising a liquid heat-transfer medium, are generally of an unpressurized design. In the worst case, a pressure build-up resulting from a tube rupture can lead to the cooler jacket itself tearing and the heat-transfer medium spilling outward. This gives rise to an acute danger to human health and the environment.

In view of the disadvantages of the prior art, it is an object of the present invention to provide an improved heat exchanger ensuring, in particular, rapid and safe pressure relief in the event of leakage. It is a further objective to provide a corresponding reactor arrangement and to specify a method for controlling the temperature of a reactor where said arrangement and said method do not have the disadvantages of the prior art.

In a first aspect of the invention, the object mentioned hereinabove is achieved by a heat exchanger (1) comprising
- a bundle of at least two heat exchanger tubes (3), wherein the bundle of heat exchanger tubes (3) has been vertically oriented and is terminated at the bottom by a heat exchanger tube plate (31),
- a heat exchanger housing (5) surrounding the bundle of heat exchanger tubes (3), wherein a liquid heat-transfer medium (7) is passed around the bundle of heat exchanger tubes (3) in the heat exchanger housing (5),
- a heat exchanger cap (9) sealing the top of the heat exchanger housing (5),
- a heat exchanger bottom (11) sealing the bottom of the heat exchanger housing (5),
- a feed point (13) for the heat-transfer medium (7), wherein said feed point is provided on the heat exchanger housing (5) and leads into the heat exchanger (1),
- an outlet (15) for the heat-transfer medium (7), wherein said outlet is provided on the heat exchanger housing (5) and leads out of the heat exchanger (1),
- an emergency relief port (17) disposed in proximity to the heat exchanger cap (9).

The heat exchanger (1) comprises a safety device (19) disposed in proximity to the heat exchanger bottom (11).

In a second aspect of the invention, the heat exchanger (1) described hereinabove is integrated into a reactor arrangement (101). This reactor arrangement (101) comprises
- a reactor (27)
- a heat exchanger (1) as defined hereinabove connected to the reactor (27),
- a pump (29) for circulating at least some of the liquid heat-transfer medium (7), wherein said pump is connected to the reactor (27) and/or the heat exchanger (1).

In a third aspect of the invention, the method according to the invention for controlling the temperature of a reactor (27) can be carried out with the heat exchanger (1) according to the invention or the reactor arrangement (101) according to the invention. This method comprises the steps of a) introducing, via a feed point, into the heat exchanger (1) defined hereinabove at least some of the liquid heat-transfer medium (7) discharged from the reactor (27) at a first temperature T1,
b) passing the liquid heat-transfer medium (7) around the heat exchanger tubes (3) of the heat exchanger (1) to exchange heat between the heat-transfer medium (7) and the heat exchanger tubes (3),
c) draining the liquid heat-transfer medium (7) from the heat exchanger (1) at a second temperature T2 and supplying the liquid heat-transfer medium (7) to the reactor (27), wherein in the event of a pressure increase in the heat exchanger (1), the overpressure which arises is reduced via at least one safety device (19).

If in connection with the heat exchanger (1) according to the invention and/or the reactor arrangement (101) according to the invention the description which follows also lists method features, these preferably relate to the method according to the invention which is yet more particularly defined hereinafter.

The heat exchanger (1) according to the invention has the advantage that due to the safety device (19) being provided in proximity to the heat exchanger bottom (11), overpressure on the liquid heat-transfer medium (7) side can be rapidly and safely reduced without the heat-transfer medium (7) in the heat exchanger (1) having to be displaced or passed through over the major part of the height of the heat exchanger (1). Consequently, a heat exchanger (1) is provided which is essentially safeguarded against all pressure increases. Furthermore, the provision of the safety device (19) means that the heat exchanger housing (5) can be of an unpressurized design and this is reflected in the cost of the heat exchanger (1) and the plant as a whole.

In this case, unpressurized means that no precautionary measures need be taken against pressures greater than 5 bar. The heat exchanger housing (5) together with the heat exchanger cap (9) and the heat exchanger bottom (11) are of course designed for a pressure of up to 3 bar exerted hydrostatically by the heat-transfer medium (7) and generated by a circulation pump for the heat-transfer medium (7).

The wording "in proximity to" with regard to the heat exchanger cap (9) and the heat exchanger bottom (11) means that the emergency relief port (17) is disposed in the upper third, in particular in the upper quarter, of the heat exchanger housing (5) and that the safety device (19) is disposed in the lower third, in particular in the lower quarter, and with very particular preference in the lower fifth, of the heat exchanger housing (5).

The invention is described in more detail hereinbelow.

The present invention firstly provides a heat exchanger (1) comprising a bundle of at least two heat exchanger tubes (3), a heat exchanger housing (5), a heat exchanger cap (9), a heat exchanger bottom (11), a feed point (13) and an outlet (15) and also an emergency relief port (17). The heat exchanger (1) according to the invention is notable in that it comprises a safety device (19) disposed in proximity to the heat exchanger bottom (11).

In a specific embodiment, the heat exchanger (1) according to the invention is a cooler.

In one development of the heat exchanger (1) according to the invention, the safety device (19) is an emergency depressurization means. For the purposes of the present invention, "emergency depressurization means" is to be understood as meaning essentially a pipe leading out of the heat exchanger housing (5) in proximity to the heat exchanger bottom (11) and leading essentially vertically upwards such that the emergency depressurization means reaches at least higher than the liquid level of the liquid heat-transfer medium (7) in the heat exchanger housing (5). This can be used to compensate the pressure drop arising on perfusion through the bundle of heat exchanger tubes. In correct operation, the safety device (19) is filled to a certain level with the liquid heat-transfer medium (7). The safety device (19) is preferably provided with trace heating in order to keep the liquid heat-transfer medium (7) at essentially the same viscosity as the heat-transfer medium (7) inside the heat exchanger (1).

Now, when pressure builds up in the heat exchanger (1) and substantially exceeds the normal operating pressure thereof, i.e., a pressure of more than 3 bar, this pressure can be released by the column of heat-transfer medium in the safety device (19) being pushed upward. Taking the example of a tube rupture with escape of water and/or steam, this means that the steam formed in the heat-transfer medium (7) can easily and advantageously expand into the safety device (19). In doing so, the steam has a substantially smaller column of the heat-transfer medium (7) to displace or to pass through compared to the mass of heat-transfer medium (7) inside the heat exchanger (1). The diameter of the safety device (19) is preferably between 100 mm and 800 mm.

In this connection, it has proved advantageous for the ratio of the free cross sectional area of the safety device (19) to the free cross sectional area of a heat exchanger tube (3) to be between 15 and 1600. This ratio ensures that in the event of leakage of a heat exchanger tube (3), the escaping steam/liquid mixture can be discharged without a large pressure build-up in the heat exchanger housing (5). An insufficient ratio of diameters would lead, in the event of leakage, to an intensified pressure increase up to the vapor pressure of the heat-transfer medium (7) at the relevant temperature.

For the purposes of the present invention, "free cross sectional area" is to be understood as meaning the area effectively available to the flow of heat-transfer medium (7).

In a further embodiment, the heat exchanger (1) comprises a containing means (21) for the heat-transfer medium (7), wherein said containing means is connected downstream of the safety device (19) and/or the emergency relief port (17). When a relatively large amount of heat-transfer medium (7) is displaced by rising pressure via the safety device (19) and/or the emergency relief port (17), the heat-transfer medium (7) can be contained by the containing means (21) without escaping from the plant. Firstly, this enhances safety since there is no escape of heat-transfer medium (7) at high temperature, and, secondly, the containing means (21) allows the heat-transfer medium (7) to be recycled to the heat exchanger (1) without contamination once the failure has been rectified. To this end, it is particularly advantageous for the containing means (21) to comprise trace heating in order to prevent an increase in the viscosity of the heat-transfer medium (7) to the point of solidification thereof. The containing means (21) can further serve to buffer differences in the fill level of the heat-transfer medium (7) and/or to collect some or all of the heat-transfer medium (7) during a shut down of the entire plant, for example during inspection work.

It is further preferable for the heat exchanger (1) to comprise a device for removing the liquid heat-transfer medium (7) from a gaseous phase, wherein said device brings about effective separation of gas and liquid in the event of leakage when the escaping substance mixture is biphasic (vapor/liquid). The device mentioned is, in particular, disposed on the containing means (21).

It is further preferable to vent the containing means (21) to the atmosphere via a sufficiently large cross section in order to release the removed gas, for example steam, into the atmosphere without a large pressure build-up in the containing means (21).

Here, the ratio of the cross sectional areas available for venting based on the cross sectional area of a heat exchanger tube (3) should be in the range from 500 to 1 000 000.

It has additionally proved advantageous to provide between the safety device (19) and the containing means (21) in the heat exchanger (1) according to the invention, a separator (23) for a portion of the liquid heat-transfer medium (7). The separator (23) is intended, in the event of leakage, to largely collect the liquid volume of the heat-transfer medium (7) in the pipe system downstream of the emergency relief port (17) and/or the safety device (19) in normal operation in order thus the pressure drop arising due to a liquid plug when it is pushed through the pipe system to the containing means (21) when this measure is not taken. The retention volume of the separator (23) should therefore correspond at least to the pipe volume of the pipe between the safety device (19) and the separator (23).

It has proved advantageous for an even and efficient temperature distribution for the heat exchanger (1) to comprise internals (25) for deflecting the liquid heat-transfer medium (7) and for the internals (25) to be positioned at or between the individual heat exchanger tubes (3) and/or at or between the individual heat exchanger tubes (3) and the housing (5). The internals (25) are preferably deflection plates which can be ring shaped or disc shaped. This is also referred to as a "disc and donut arrangement". In particular, the internals (25) are aligned horizontally and the heat-transfer medium (7) therefore flows at the heat exchanger tubes (3) essentially transversely.

It is particularly preferable for the heat exchanger (1) to be a salt bath cooler and/or for the liquid heat-transfer medium to be a salt melt. The salt melt is preferably a mixture of alkali metal nitrates and alkali metal nitrites. Particularly preferred salt melts are composed of 53 weight % of potassium nitrate, 40 weight % of sodium nitrite and 7 weight % of sodium nitrate or 60 weight % of potassium nitrate and 40 weight % of sodium nitrite. These mixtures form a eutectic mixture and have a melting point of about 142° C. The operating temperature of these salt melts is between 200° C. and 500° C.

The present invention can be applied to heat-transfer oils as well as to a liquid heat-transfer medium (7) in the form of a salt melt. However, these heat-transfer oils are generally limited to a maximum operating temperature of 250° C. to 280° C. which is insufficient for cooling many exothermic reactions, for example in shell-and-tube reactors.

The present invention further provides a reactor arrangement (101) comprising a reactor (27), a heat exchanger (1) as defined hereinabove connected to the reactor (27), and a pump (29) for circulating at least some of the liquid heat-transfer medium (7), wherein said pump is connected to the reactor (27) and/or the heat exchanger (1).

The fact that the reactor arrangement (101) according to the invention comprises the heat exchanger (1) according to the invention means that essentially the same advantages as described hereinabove are achieved. In particular, overpressure occurring in the heat exchanger (1) on the liquid heat-transfer medium (7) side can be rapidly and safely reduced in the reactor arrangement (101) according to the invention. The heat-transfer medium (7) in the heat exchanger (1) essentially need not be displaced or passed through since the pressure can be reduced via the safety device (19) of the heat exchanger (1). The provision of the heat exchanger (1) according to the invention means that the heat exchanger system of the reactor arrangement (101) can consequently be of an essentially unpressurized design which reduces the cost of the reactor arrangement (101).

In this case, unpressurized means that no precautionary measures need be taken for pressures greater than 5 bar. The reactor arrangement (101) is of course designed for a pressure of up to 3 bar exerted hydrostatically by the heat-transfer medium (7) and generated by a circulation pump for the heat-transfer medium (7). In addition, the reaction volume of the reactor (27) is designed for the prevailing reaction pressures of up to 80 bar on the part of the reaction media.

For the purposes of the present invention, the wording "heat exchanger (1) connected to the reactor (27)" is to be understood as meaning that the feed point (13) provided on the heat exchanger housing (5) and the outlet (15) for the heat-transfer medium (7) provided on the heat exchanger housing are connected in a suitable manner, in particular welded, to a corresponding feed point and outlet of the reactor (27). It is convenient for a control valve to be installed either in the feed point (13) or in the outlet (15) in order that the amount of heat-transfer medium (7) circulated through the heat exchanger (1), and thereby the temperature in the reactor (27), can be adjusted or controlled.

In a preferred embodiment, the reactor (27) is a shell-and-tube reactor for carrying out exothermic or endothermic reactions.

In the case of exothermic reactions, the heat generated in the exothermic reaction is absorbed by the liquid heat-transfer medium (7) and supplied to the heat exchanger (1) according to the invention, in this case a cooler, by the circulation of the heat-transfer medium (7). As described hereinabove, the heat exchanger (1) according to the invention can be a salt bath heat exchanger. In particular, the heat exchanger tubes (3) of the salt bath cooler can be evaporator tubes in which water is vaporized. In this way, the energy liberated during the reaction can be recovered in the form of steam and used profitably to drive steam turbines or for heating purposes for example.

The heat exchanger (1) according to the invention can also be used for superheating steam. This is particularly advantageous when the superheated steam obtained is to be converted into electrical energy via a steam turbine for example. The utilization of the vaporization energy, i.e., the efficiency, increases the more energy can be supplied in addition to the vaporization energy. To this end, steam already generated, for example from a first heat exchanger (1) according to the invention, is passed through a further heat exchanger (1) according to the invention in order to raise the temperature of the steam. Consequently, the present invention can be used to distinctly enhance efficiency.

The reactor arrangement (101) can further comprise an expansion vessel not shown in the figures. The density of the heat-transfer medium (7), i.e., the volume occupied by it, changes as a function of temperature. To this end, a sufficiently large expansion space, in the present case an expansion vessel, is to be provided. The expansion of the heat-transfer medium (7) would otherwise exert further pressure on the heat exchanger (1) and/or the reactor (27).

A third aspect of the present invention is a method for controlling the temperature of a reactor (27) comprising the steps of a) introducing, via a feed point, into the heat exchanger (1) as claimed in any one of claims 1 to 7 at least some of the liquid heat-transfer medium (7) discharged from the reactor (27) at a first temperature T1,
b) passing the liquid heat-transfer medium (7) around the heat exchanger tubes (3) of the heat exchanger (1) to exchange heat between the heat-transfer medium (7) and the heat exchanger tubes (3),
c) draining the liquid heat-transfer medium (7) from the heat exchanger (1) at a second temperature T2 and supplying the liquid heat-transfer medium (7) to the reactor (27), wherein in the event of a pressure increase in the heat exchanger (1), the overpressure which arises is reduced via at least one safety device (19).

As described hereinabove, a failure in the heat exchanger tubes (3) can occur when operating a heat exchanger (1) according to the invention as a cooler. These leaks can take the form either of one or more small to relatively large holes or even complete rupture of a heat exchanger tube (3). The cooling medium side of the heat exchanger (1) is generally operated at a higher pressure than the heat-transfer medium side of the reactor (27). In this case there is ingress of cooling medium, for example water, into the liquid heat-transfer medium (7). When the temperature conditions prevailing at the heat-transfer medium side are in excess of the boiling point of the cooling medium, the cooling medium vaporizes very rapidly and then rapidly leads to a pressure increase. This pressure increase can occur unexpectedly and unforeseeably and therefore no countermeasures can be taken in a sufficiently short time. In the event of such a pressure increase, the overpressure which arises is reduced via the safety device (19) by the steam which is formed displacing or passing through the column of heat-transfer medium (7) in the safety device (19), therefore avoiding damage to the heat exchanger housing (5). In accordance with the invention, an overpressure which arises and which is of 2 bar or above is reduced by the safety device (19).

In the case where the heat exchanger (1) according to the invention is operated as a cooler, the first temperature T1 at which at least some of the liquid heat-transfer medium (7) is discharged from the reactor (27) is 200° C. to 450° C., while the second temperature T2 at which the liquid heat-transfer medium (7) is discharged from the heat exchanger (1) is 120° C. to 300° C.

It has proved advantageous in the method according to the invention when in step b) the heat-transfer medium (7) meanders between the heat exchanger tubes (3). This means that, as a result of the optional presence of internals (25) for deflecting the liquid heat-transfer medium (7), said liquid heat-transfer medium is conducted essentially transversely to the heat exchanger tubes (3). In particular, the heat-transfer medium (7) is supplied at the bottom end of the heat exchanger (1) and discharged at the top end of the heat exchanger (1) via the outlet (15). Conducting the heat-transfer medium (7) in this way ensures optimal heat transfer from the heat-transfer medium (7) to the cooling medium in the heat exchanger tubes (3).

The method according to the invention is advantageously performed in a reactor (27) as a shell-and-tube reactor for carrying out exothermic or endothermic reactions.

The reaction carried out in the reactor (27) can, in particular, be a partial gas phase oxidation. This gas phase oxidation preferably comprises the oxidation of propene to acrolein, isobutene to methacrolein, acrolein to acrylic acid, methacrolein to methacrylic acid and o-xylene to phthalic anhydride.

In a further aspect of the present invention, the heat exchanger (1) described hereinabove is used to control the temperature of a reactor (27) for carrying out exothermic reactions, wherein the reactor (27) is a shell-and-tube reactor and the liquid heat-transfer medium (7) is a salt melt.

Further objectives, features, advantages and possible applications will become apparent from the following description of the working examples of the present invention with reference to the figures. All features described and/or illustrated in figures, alone or in any combination, form the subject matter of the present invention irrespective of their combination in the claims or the claims to which they refer back.

Figure 2:
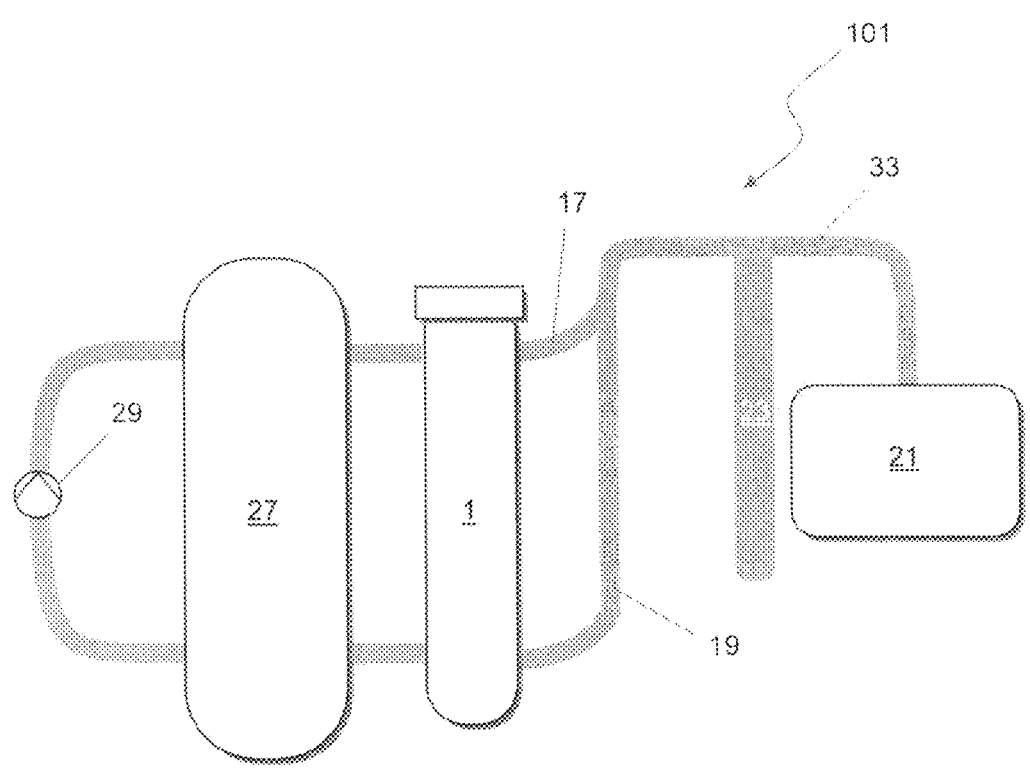

FIG. 1 shows a schematic diagram of a heat exchanger (1) in one embodiment of the invention and FIG. 2 shows a schematic diagram of a reactor arrangement (101) in one embodiment of the invention.

A heat exchanger 1 according to the invention is shown in FIG. 1. The outer shell of the heat exchanger 1 is formed by the heat exchanger housing 5, the heat exchanger cap 9 which seals the top and the heat exchanger bottom 11 which seals the bottom.

The heat exchanger tubes 3 are vertically oriented inside the heat exchanger 1 and terminated at the bottom by a heat exchanger tube plate 31. In one embodiment of the invention, wherein the heat exchanger (1) is operated as a cooler, the heat exchanger tubes 3 have been at least partially filled with water which is introduced from a supply not shown in FIG. 1. In one embodiment, deflection plates 25 are installed between the heat exchanger tubes 3 and/or between the heat exchanger tubes 3 and the heat exchanger housing 5 such that a heat-transfer medium 7 passes around the heat exchanger tubes 3 in a meandering flow.

The liquid heat-transfer medium 7 is supplied via a feed point 13 provided on the heat exchanger housing 5 in the bottom half of the heat exchanger housing 5. Supply is preferably effected at about the height of the heat exchanger tube plate 31. The heat-transfer medium 7 is passed at and between the heat exchanger tubes 3 largely transversely to the orientation of the heat exchanger tubes 3, i.e., essentially horizontally, and passed through the corresponding deflection plates 25. The heat-transfer medium 7 which has been cooled down in temperature is discharged from the heat exchanger 1 again via an outlet 15 provided on the heat exchanger housing 5. In particular, the outlet 15 is located just below the heat exchanger cap 9. As can be discerned from FIG. 1, an emergency relief port 17 is likewise located in the upper region of the heat exchanger housing 5, just below the heat exchanger cap 9. The emergency relief port 17 normally has a diameter between 100 mm and 800 mm. The safety device 19 is disposed opposite the emergency relief port, in the lower region of the heat exchanger housing 5, in particular in the lower third, preferably in the lower quarter, in particular in the lower fifth. The safety device 19 is, in particular, an emergency depressurization means formed from a type of riser line.

FIG. 2 shows a reactor arrangement 101 comprising a reactor 27 which is preferably a shell-and-tube reactor for carrying out exothermic or endothermic reactions. In such a shell-and-tube reactor, a bundle of vertically oriented reaction tubes is disposed between two tube plates. The reaction tubes can comprise a packing of a bed of catalyst material (fixed-bed catalyst). The liquid heat-transfer medium 7 which absorbs and dissipates the heat generated in the exothermic reaction or supplies the heat required in the endothermic reaction is passed around the reaction tubes.

The constant reaction conditions are provided by, at a predetermined temperature, the heat-transfer medium 7 being circulated for temperature-controlling purposes using a pump.

The heat-transfer medium 7 preferably enters the reactor 27 in proximity to the bottom tube plate and exits the reactor in proximity to the upper tube plate.

The heat-transfer medium 7 flows through the reactor 27 and at least some of said heat-transfer medium is circulated by at least one pump 29. The pump 29 and the corresponding input and output lines of the pump 29 are advantageously trace heated in order that no undesired cooling down and attendant decrease in viscosity of the heat-transfer medium 7 takes place. The pump 29 is ideally attached directly to the reactor housing. In the embodiment shown, the heat exchanger 1 according to the invention is disposed essentially opposite the pump 29. Said heat exchanger is advantageously disposed a relatively short distance, i.e., at a distance of from 10 cm to 250 cm, from the reactor 27. The emergency relief port 17 leads out of the upper region of the heat exchanger 1 as shown in FIG. 1. The safety device 19 which is essential to the present invention is disposed opposite the emergency relief port, in the lower region of the heat exchanger 1.

In the event of a tube rupture where there is an inflow of cooling medium, mainly water and water vapor, from the heat exchanger tubes 3 into the heat-transfer medium 7, the inflowing water is very rapidly vaporized and an unexpectedly high pressure therefore builds up in the heat exchanger 1. The presence of the safety device 19 allows the pressure arising in the lower region of the heat exchanger 1 to be released relatively directly via the safety device 19. This is effected by the column of liquid heat-transfer medium 7 in the safety device 19 being pushed upward. At the upper end of this column of heat-transfer medium, there is generally a region where the viscosity of the heat-transfer medium is relatively high, right up to almost solid, highly viscous portions. These portions, i.e., a kind of plug, are initially contained in the separator 23, in particular in an intermediate separator, and thereby removed from the further system. The subsequent mixture of heat-transfer medium 7 and water and also water vapor is passed through a pipe 33 into a downstream containing means 21. Both the safety device 19 and the pipe 33 and the containing means 21 are trace heated in order to prevent an increase in the viscosity of the heat-transfer medium 7 or solidification.

The liquid heat-transfer medium 7 can be removed, in the containing means 21, from the water/water vapor mixture. This can be effected, in particular, using a device for removing the liquid heat-transfer medium 7 from a gaseous phase. The removal can be effected via a cyclone separator or simply via gravitational separation. The heat-transfer medium 7 can then be supplied back to the heat exchanger 1 or the reactor 27 via a line not shown in FIG. 2.

The invention claimed is:

1. A heat exchanger (1), comprising:
   a bundle of at least two heat exchanger tubes (3), wherein the bundle of heat exchanger tubes (3) has been vertically oriented and is terminated at the bottom by a heat exchanger tube plate (31),
   a heat exchanger housing (5) surrounding the bundle of heat exchanger tubes (3), wherein a liquid heat-transfer medium (7) is passed around the bundle of heat exchanger tubes (3) in the heat exchanger housing (5),
   a heat exchanger cap (9) sealing the top of the heat exchanger housing (5),
   a heat exchanger bottom (11) sealing the bottom of the heat exchanger housing (5),
   a feed point (13) for the heat-transfer medium (7), wherein said feed point is provided on the heat exchanger housing (5) and leads into the heat exchanger (1),
   an outlet (15) for the heat-transfer medium (7), wherein said outlet is provided on the heat exchanger housing (5) and leads out of the heat exchanger (1),
   an emergency relief port (17) disposed in proximity to the heat exchanger cap (9),
   wherein
   the heat exchanger (1) comprises a safety device (19) which is essentially a pipe leading out of the heat exchanger housing (5) in proximity to the heat exchange bottom (11) and leading essentially vertically upwards such that the safety device reaches at least higher than a liquid level of the liquid heat-transfer medium (7) in the heat exchanger housing (5) and wherein the safety device is disposed in proximity to the heat exchanger bottom (11).

2. The heat exchanger (1) according to claim 1, wherein a second safety device (19) is an emergency depressurization means.

3. The heat exchanger (1) according to claim 1, wherein the ratio of a free cross sectional area of the safety device (19) to a free cross sectional area of a heat exchanger tube (3) is between 15 and 1600.

4. The heat exchanger (1) according to claim 1, wherein the heat exchanger (1) comprises a containing means (21) for the heat transfer medium (7), wherein said containing means is connected downstream of the safety device (19) or the emergency relief port (17).

5. The heat exchanger (1) according to claim 1, wherein the heat exchanger (1) comprises a device for removing the liquid heat-transfer medium (7) from a gaseous phase.

6. The heat exchanger (1) according to claim 1, wherein between the safety device (19) and a containing means (21) the heat exchanger (1) comprises a separator (23) for a portion of the liquid heat-transfer medium (7).

7. The heat exchanger (1) according to claim 1, wherein the heat exchanger (1) comprises internals (25) for deflecting the liquid heat-transfer medium (7) and the internals (25) are positioned at or between the individual heat exchanger tubes (3) or at or between the individual heat exchanger tubes (3) and the heat exchanger housing (5).

8. The heat exchanger (1) according to claim 1, wherein the heat exchanger (1) is a salt bath heat exchanger or the liquid heat-transfer medium (7) is a salt melt.

9. A reactor arrangement (101), comprising:
   a reactor (27),
   a heat exchanger (1) according to claim 1 connected to the reactor (27),
   a pump (29) for circulating at least some of the liquid heat-transfer medium (7), wherein said pump is connected to the reactor (27) or the heat exchanger (1).

10. The reactor arrangement (101) according to claim 9, wherein the reactor (27) is a shell-and-tube reactor for carrying out exothermic or endothermic reactions.

11. A method for controlling the temperature of a reactor (27), comprising:
   a) introducing, via a feed point, into the heat exchanger (1) according to claim 1 at least some of a liquid heat-transfer medium (7) discharged from the reactor (27) at a first temperature T1,
   b) passing the liquid heat-transfer medium (7) around the heat exchanger tubes (3) of the heat exchanger (1) to exchange heat between the heat-transfer medium (7) and the heat exchanger tubes (3), c) draining the liquid heat-transfer medium (7) from the heat exchanger (1) at a second temperature T2 and supplying the liquid heat-transfer medium (7) to the reactor (27), wherein in the event of a pressure increase in the heat exchanger (1), the overpressure which arises is reduced via at least one safety device (19) which is essentially a pipe leading out of the heat exchanger housing (5) in proximity to the heat exchanger bottom (11) and leading essentially vertically upwards such that the safety device reaches at least higher than a liquid level of the liquid heat-transfer medium (7) in the heat exchanger housing (5).

12. The method according to claim 11, wherein in step b) the heat-transfer medium (7) meanders between the heat exchanger tubes (3).

13. The method according to claim 11, wherein the reactor (27) is a shell-and-tube reactor for carrying out exothermic or endothermic reactions.

14. The method according to claim 11, wherein the reaction carried out in the reactor (27) is a partial gas phase oxidation.

15. The method according to claim 14, wherein the partial gas phase oxidation comprises the oxidation of propene to acrolein, isobutene to methacrolein, acrolein to acrylic acid, methacrolein to methacrylic acid and o-xylene to phthalic anhydride.

16. A method for cooling a reactor (27), comprising:
carrying out an exothermic reaction cooling said reactor with the heat exchanger (1) according to claim 1, wherein the reactor (27) is a shell-and-tube reactor and the liquid heat-transfer medium (7) is a salt melt.

* * * * *